United States Patent Office 2,997,345
Patented Aug. 22, 1961

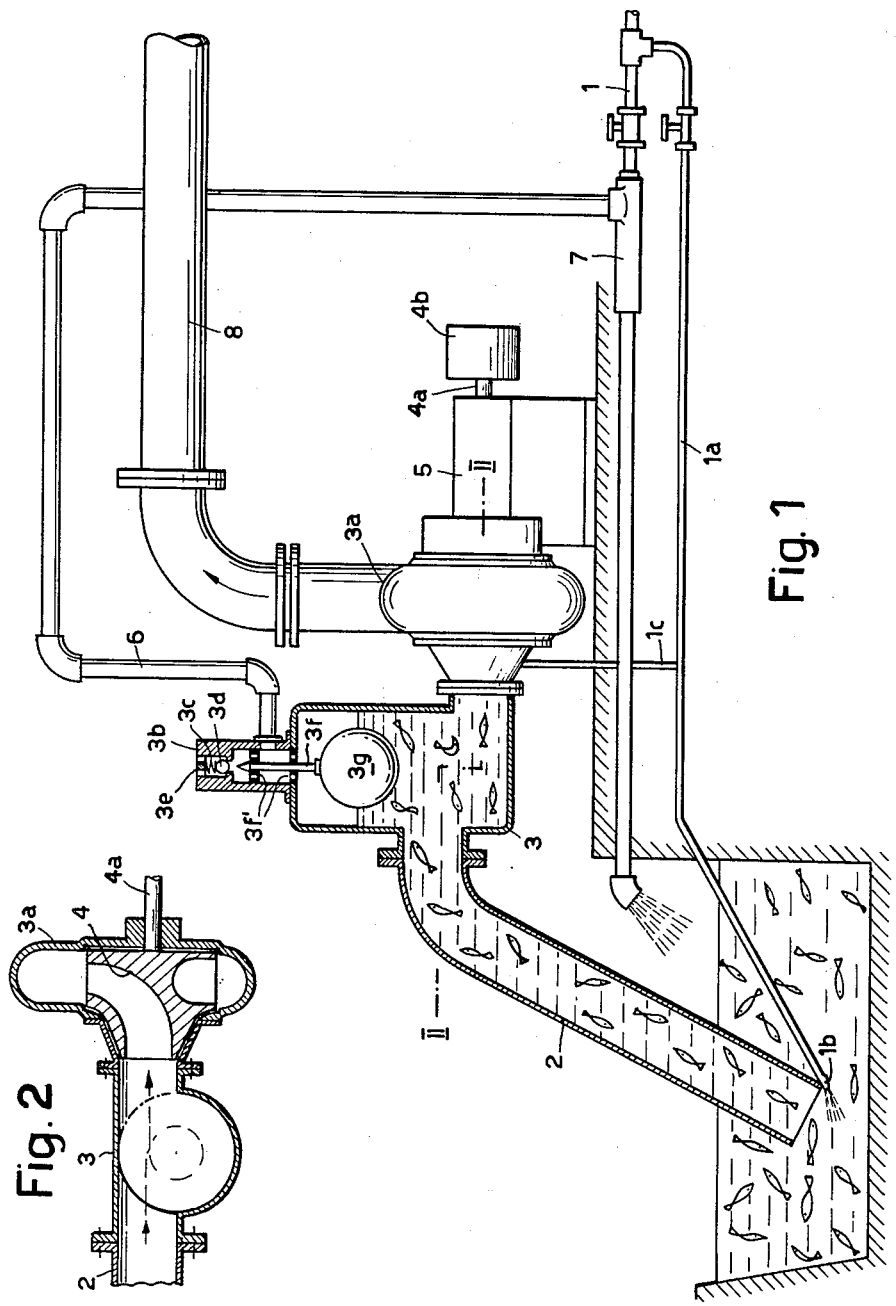

2,997,345
FISHPUMP
Martin Stähle, Casilla 4083, Lima, Peru
Filed Aug. 14, 1959, Ser. No. 833,887
1 Claim. (Cl. 302—14)

My present invention relates to a hydraulic fish conveyor which operates by means of a centrifugal pump.

Fish conveyors of this type are known in various constructions. The main object of my present invention is a substantial improvement of the overall efficiency by producing a substantially airfree, uniform stream of fish and water with a view of avoiding bodily injury to the fish, operating troubles and breakdowns resulting from such injury.

One form of my invention is shown by way of example in the drawing, in which—

FIG. 1 shows the plant in vertical section, and FIG. 2 is a horizontal section on the line II—II of FIG. 1.

On the entrance end of a suction pipe 2 which is immersed in a container filled with water and fish to be lifted, is provided a nozzle 1b on a branch 1a of a pressure water line 1, of which the jet keeps in movement the fish bodies and the water in said container in order to prevent the suction-pipe entrance opening from being obstructed and clogged. The stream of fish and water rising through suction pipe 2 arrives tangentially in a circular housing 3 and is set into spiral or gyratory motion therein because the inlet and outlet are at different elevations and tangential. Housing 3 and pump casing 3a are interconnected.

In order to prevent the level in housing 3 from rising and obstructing the air discharge pipe 6 when a small volume of air enters housing 3, an air inlet valve 3b to 3g is provided on the topmost point of the axis of rotation in housing 3, which valve is actuable by a float 3g. When the level of the fish-and-air mixture in housing 3 reaches the float 3g, a rod 3f fixed to the latter lifts a ball 3d from its seat against the pressure of a spring 3c and causes air to flow from the outside into housing 3. The level in the latter then drops, and ball 3d by the atmospheric pressure is depressed again on to its seat and again seals housing 3 from the outside. The spring 3c which loads ball 3d, abuts against a perforated insert 3e of housing 3b, and float rod 3f is movably guided in two perforated inserts 3f'.

The pump impeller 4 is fixed on a shaft 4a which is rotatably mounted in a pedestal 5 and carries a fast pulley 4b. The air entrained through suction pipe 2 accumulates in the axis of housing 3 and is continuously aspirated through the lower perforated float-rod guide 3f' and a line 6 by a water-jet air pump 7 in line 1.

Impeller 4 is a one-channel runner, as known per se in liquid-manure pumps, for example, which pumps the water-and-fish stream into housing 3a and thence into pipe 8. In lieu of one channel runners, two-channel runners have been successfully used. The water flowing through pump 7 furnishes the water required in the container for floating the fish bodies.

In order to prevent the fish bodies from being caught in the gap between impeller 4 and the entrance adapter, water is conducted under pressure from pipe 1a through a pipe 1c into said gap.

What I claim as new and desire to secure by Letters Patent is:

In a hydraulic fish-lifting plant comprising a centrifugal pump having a suction pipe for the fish-and-water stream and pump-driving means, the improvement comprising a circular housing interposed between the pump casing and the suction pipe, the inlet and outlet of said housing being at different elevations and tangential so that said stream is rotated in the housing and entrained air accumulates in the axis of rotation thereof, and a vacuum pump connected through a pipe to said housing at the uppermost point of said axis for continually sucking off the air accumulating in the housing.

References Cited in the file of this patent

UNITED STATES PATENTS

| | | |
|---|---|---|
| 2,655,868 | Lindau | Oct. 20, 1953 |
| 2,666,671 | Kimmerle | Jan. 19, 1954 |
| 2,722,461 | Tholl | Nov. 1, 1955 |
| 2,749,187 | Strom | June 5, 1956 |
| 2,861,841 | Pengra | Nov. 25, 1958 |